April 20, 1926.  1,581,795
J. H. DELANEY
ACOUSTIC FINISH FOR INTERIORS OF BUILDINGS AND METHOD OF MAKING THE SAME
Filed Dec. 24, 1925

Witness
C. C. Holly

Inventor
John Henry Delaney
by James R. Townsend
his atty

Patented Apr. 20, 1926.

1,581,795

UNITED STATES PATENT OFFICE.

JOHN HENRY DELANEY, OF LOS ANGELES, CALIFORNIA.

ACOUSTIC FINISH FOR INTERIORS OF BUILDINGS AND METHOD OF MAKING THE SAME.

Application filed December 24, 1925. Serial No. 77,631.

*To all whom it may concern:*

Be it known that I, JOHN HENRY DELANEY, a citizen of the United States, residing at Los Angeles, in the county of Los Angeles and State of California, have invented and discovered a new and useful Acoustic Finish for Interiors of Buildings and Methods of Making the Same, of which the following is a specification.

An object of this invention is to provide for walls and ceilings of buildings a surface finish which will minimize the echoing effect of the walls of auditoriums and other rooms.

Another object is superior insulating effects.

I have discovered that it is possible to produce a surface on walls and ceilings by making a mixture of water, plaster of Paris, and lumps of porous mineral material such as pumice stone, coke or the like and applying the same by dashing or by shooting with compressed air through a nozzle supplied with liquid after the manner of a cement gun, and thereby applying the liquid mixture to the interior surface of masonry, plastered walls, or any suitable face to which the material will adhere, and then shortly after the material has set, scraping or cutting off the surface so as to leave a face containing exposed porous aggregate; the finish thus produced upon the wall becomes so absorbent to sound as to correct and perfect the acoustics of the room; and by adding to the liquid composition shot from a nozzle, material such as calcium carbide or a mixture of carbonate of soda and tartaric acid or other materials capable of setting up an effervescence in the applied composition, a pitted surface may be produced and superior results insured.

The liquid mixture may be produced in a bowl and dashed on the surface by a paddle quickly so that effervescence will occur before the coating sets.

I have found that the porous material referred to can be shot from a cement gun with great ease, facility and success because the lumps of pumice stone or other light coarsely porous mineral substance act as a carrier for the powdered material.

I have successfully used the pumice stone in lumps ranging from sizes that will just go through a screen ranging from one-sixteenth inch mesh to one-half inch mesh.

I have discovered that the granular pumice stone or coke of light specific gravity when shot through a cement gun serves as a carrier for the powdered constituents as plaster of Paris or Portland cement, and the like, and when the composition is set, the same can, because of its softness, be cut to afford the desired surface, and will produce ornamental effects.

These effects may be heightened by dyeing the pumice stone with permanent colors before forming the mixture.

I have discovered that by taking care in the dyeing of the pumice stone, a deeper color will appear at the surface of a lump or grain than at the center, and that by scraping the wall surface and thereby cutting the pieces of pumice stone, variegated colors may be added to each particular piece.

The cementitious material having a gypsum base, and likewise the Portland cement are used without retarders so that the form of the pits made by the effervescence will be preserved and also so that the work may rapidly proceed.

Both coke, and pumice stone colored and uncolored may be used, thus adding to the variety of color effects.

The operations of dashing and of shooting by an air gun, are regarded as equivalents to an extent, but the shooting by an air gun is preferred under most conditions.

In some instances the material may be applied in the usual way of applying plaster with a hawk and trowel.

Other objects, and advantages may appear from the accompanying drawing, the subjoined detailed description and the appended claims.

Figure 1:
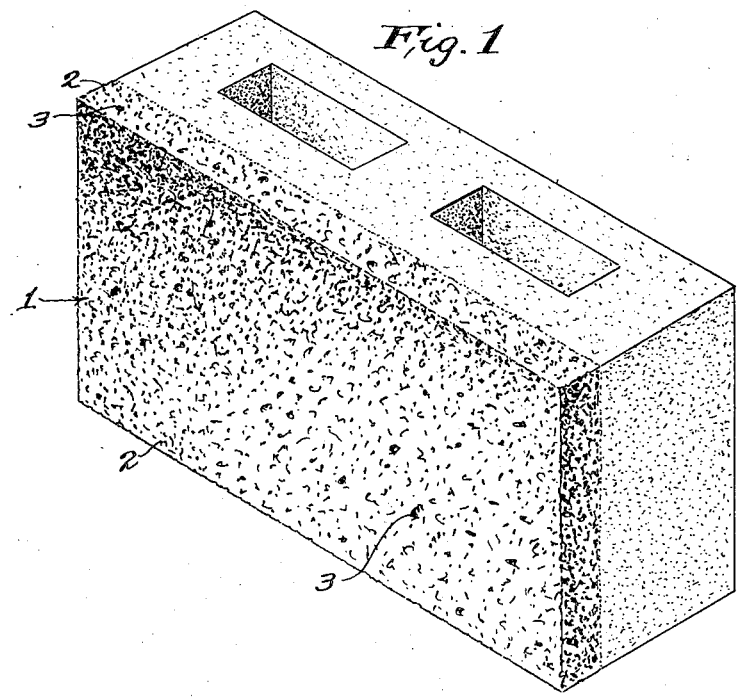
Figure 1 is a broken perspective view of a wall provided with a sound absorbing surface made in accordance with this invention.
Figure 2:
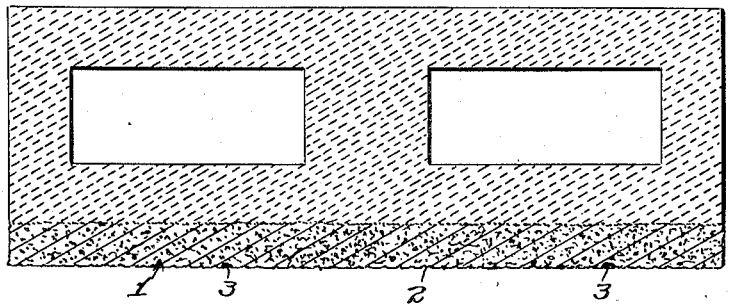
Fig. 2 is a transverse section of such wall.

1 indicates the cementitious body, 2 the coarsely porous lumps, and 3 the pits in the surface.

A feature of this invention is the application of the calcium carbide or equivalent to the plastic or semiliquid mass and quickly applying the mass to the surface to be coated as by dashing, or by shooting by air guns, and surfacing the mass when set, so as to open bubbles and expose pits.

In practice the dry materials decided upon including the cementitious powder and the lumps of light coarsely porous material may be placed in the hopper of the cement gun; and the cement gun, supplied with water in the usual way will be operated, and the mixture shot onto the surface to be coated; and when the surface has become sufficiently set to allow a scraper or cutting tool to be employed thereon, the surface will be scraped, cut or trimmed off by the use of suitable scrapers or cutters which will expose the insides of the lumps of porous material. Such scraping also opens cavities formed by bubbles of gas produced by the calcium carbide and moisture, or the equivalent.

The effervescent effect of the calcium carbide or the like increases the porosity of the surface and leaves deep pits, as at 3 and thereby reflection of sound from the surface is minimized.

In carrying out the invention I have applied to plaster walls, coatings in accordance with this invention to the thickness of one inch; and coatings of greater or less thickness may be applied as preferred.

The plaster of Paris quickly sets and forms a matrix for the porous lumps; and the scraping is promptly effected while the plaster of Paris is still damp.

The coarsely porous mineral material not only serves as a sound absorber, but also gives superior binding strength to the coating; and when the surface is completed and dry, though formed with a cement having a gypsum base, the coating is hard and strong, and not likely to be damaged nor to fall from the surface to which it is applied.

By reason of the light, specific gravity of the pumice and coke, the material is not likely to break away or fall from the walls or ceilings to which it is applied.

In applying by a paddle, the semiliquid or plastic mass will be dashed on the wall or other support, quickly, while the process of effervescing is going on so as not to destroy the bubbles that are to produce the pitted effect.

The cutting and scraping process produces open pits, and substantially plane faced lumps of the coarsely porous light mineral material, thus securing the best character of surface for the purposes stated.

I claim.

1. A sound absorbing finish consisting of a coating of material having a gypsum base, and exposed lumps of porous mineral material.

2. A sound absorbing finish consisting of a coating consisting of material having a gypsum base; lumps of coarsely porous mineral material; water; and lumps of material adapted to produce effervescence in the mixture when applied to the surface.

3. The method set forth of producing a sound absorbing surface, which consists in dashing onto the surface to be covered a mixture of plaster having a gypsum base, and a granular porous filler.

4. The method set forth of producing a sound absorbing surface, which consists in dashing onto the surface to be covered, a mixture of plaster having a gypsum base, and lumps of pumice stone filler, and a material adapted to produce effervescence in the mass before the same becomes set.

5. The method of producing a sound absorbing surface, which consists in shooting onto the surface a coating composed of a product having a gypsum base, a granular porous mineral material, and water; and after the body has set, removing the surface from said body.

6. The finish set forth consisting of lumps of coarsely porous mineral substance and a pitted cementious matrix for said lumps.

7. The finish composed of a matrix having bubbles therein and substantially plane faced coarsely porous lumps in the matrix.

In testimony whereof, I have hereunto set my hand at Los Angeles, California, this 11th day of December, 1925.

JOHN H. DELANEY.